R. BUTTERWORTH.
Screw and Toggle Lever-Press.
No. 161,751.  Patented April 6, 1875.
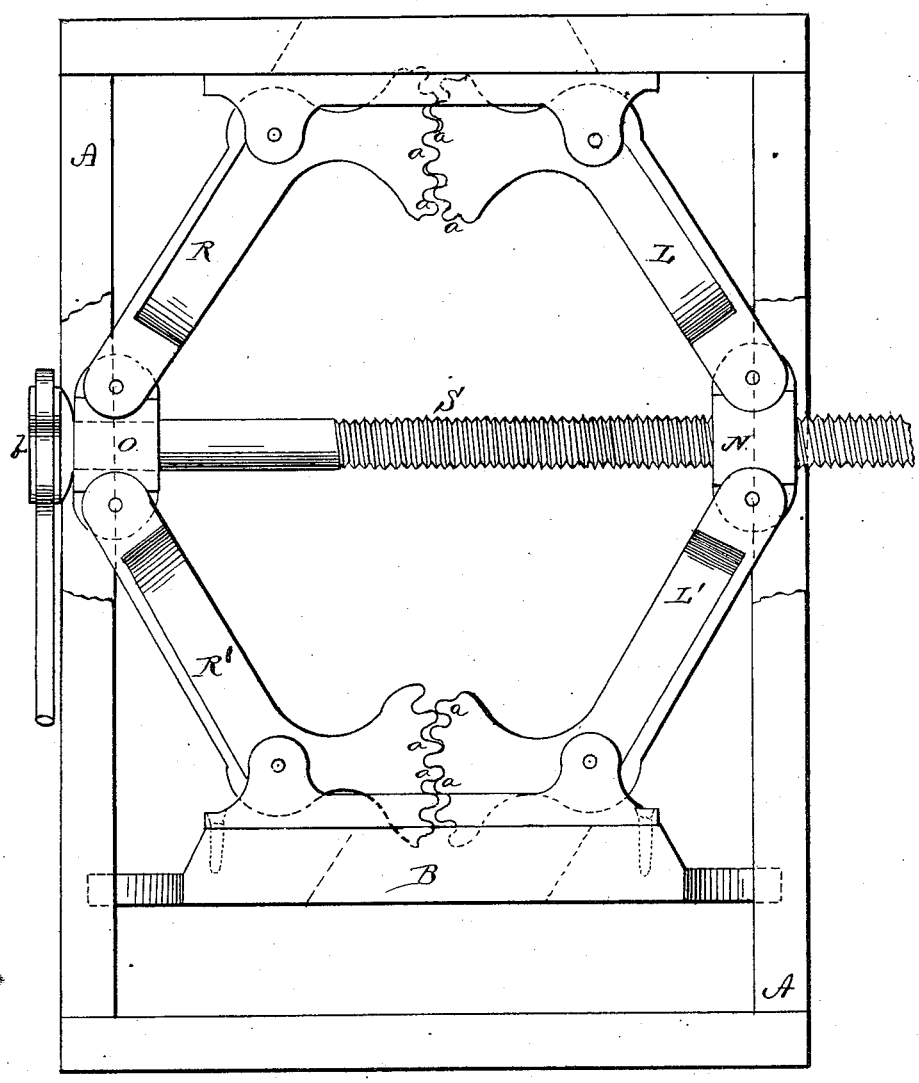

UNITED STATES PATENT OFFICE.

ROBERT BUTTERWORTH, OF TRENTON, NEW JERSEY.

IMPROVEMENT IN SCREW AND TOGGLE LEVER PRESSES.

Specification forming part of Letters Patent No. 161,751, dated April 6, 1875; application filed March 10, 1875.

*To all whom it may concern:*

Be it known that I, ROBERT BUTTERWORTH, of Trenton, in the county of Mercer and in the State of New Jersey, have invented certain new and useful Improvements in Cider-Presses; and do hereby declare that the following is a full, clear, and exact description thereof, reference being had to the accompanying drawings and to the letters of reference marked thereon, making a part of this specification.

The nature of my invention consists in the construction and arrangement of a press, as will be hereinafter more fully set forth.

In order to enable others skilled in the art to which my invention appertains to make and use the same, I will now proceed to describe its construction and operation, referring to the annexed drawings, which represent a front elevation of my press.

A is the press-frame; B, the follower-beam. R L and R' L' are two pairs of toothed elbow-levers or arms. S is the screw-shaft, which is fitted to and sustained by the nut N and box O. The press-frame A is constructed of two horizontal beams placed at a suitable distance one above the other, and held in position by four uprights, which are framed into the beams—two at either side. These uprights are set a short distance apart at the ends of the press, and serve as guides or lateral supports to the follower, the ends of which project between the uprights, and thus prevent any lateral movement of the follower. R L and R' L' are elbow-levers or arms, provided upon their inner ends with a series of teeth, $a$ $a$, set upon a line concentric with the pivots upon which the levers turn when actuated by the screw-shaft S, nut N, and box O. The outer ends of the levers R L are pivoted to the press-frame, and the outer ends of the levers R' L' to the follower, or to a metallic shoe attached thereto, as shown, so that when turning upon their pivots the teeth of either pair are in contact.

It is obvious that the levers may be placed any distance apart desired, and the necessary connection between them made by the use of toothed intermediates.

The opposite or outer ends of the levers L L' are pivoted to the nut N, and of the levers R R' to the box O. The nut N is fitted to the thread cut upon the screw-shaft, and the box O fitted to the body of the shaft, and held in its position by collars formed thereon.

To work the press, an arm or handle is attached to the square collar $b$ at the outer end of the screw-shaft, and the screw, being turned in the right direction, draws the ends of the levers, pivoted to the nut N and box O, toward each other, and forces the follower B downward, while the teeth $a$, at the inner ends of each pair of levers, being in contact, cause them all to maintain an equal angle with the screw-shaft, thereby causing the movement of the follower to be in a direction at right angles with the screw, while by the same means it is firmly held in a line parallel thereto. If a quicker movement of the follower relatively to the revolutions of the screw-shaft is desired, a left-hand thread is cut upon the denuded portion of the screw-shaft, and an internal thread corresponding thereto cut in the box O.

Having thus fully described my invention, what I claim as new, and desire to secure by Letters Patent, is—

The combination, with the frame A and follower B and screw S, of the nut N, box O, the toothed levers R' L', pivoted to the follower and to the box and nut, respectively, and the toothed levers R L, pivoted to the frame and to the box and nut, respectively, all constructed and operating substantially as set forth.

In testimony that I claim the foregoing, I have hereunto set my hand and seal this 19th day of February, 1875.

ROBERT BUTTERWORTH. [L. S.]

Witnesses:
   WESLEY C. OWENS,
   GEORGE HITCHENS.